US011823667B2

(12) United States Patent
Penneru et al.

(10) Patent No.: US 11,823,667 B2
(45) Date of Patent: Nov. 21, 2023

(54) CONTEXTUALLY-ADAPTIVE CONVERSATIONAL INTERFACE

(71) Applicant: Oracle International Corporation, Redwood Shores, CA (US)

(72) Inventors: Raja V. Penneru, Dublin, CA (US); Kaarthik Balasubrahmanian, Belmont, CA (US); Donald Creig Humes, Yorktown, CA (US); Sridhar Tadepalli, Bangalore (IN); Saravanan Anandan, Fremont, CA (US); Kartik Raghavan, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/670,891

(22) Filed: Feb. 14, 2022

(65) Prior Publication Data
US 2023/0065223 A1 Mar. 2, 2023

(30) Foreign Application Priority Data
Aug. 26, 2021 (IN) .............................. 202141038662

(51) Int. Cl.
*G10L 15/18* (2013.01)
*G10L 15/22* (2006.01)
*G06F 3/16* (2006.01)

(52) U.S. Cl.
CPC .......... *G10L 15/1815* (2013.01); *G06F 3/167* (2013.01); *G10L 15/22* (2013.01)

(58) Field of Classification Search
CPC ...... G10L 15/1815; G10L 15/22; G06F 3/167
See application file for complete search history.

(56) References Cited

U.S. PATENT DOCUMENTS 7,249,018 B2 7/2007 Ross et al.
7,949,999 B1 * 5/2011 Willeford ................ G06F 8/656
717/121

(Continued)

OTHER PUBLICATIONS

"Adding context to a chat conversation by using Person or application data," Retrieved at https://docs.bmc.com/docs/bmcchatbot/adding-context-to-a-chat-conversation-by-using-person-or-application-data-825782533.html, Retrieved on Feb. 15, 2022, pp. 1-6.
"Integrate a Power Virtual Agents bot," Retrieved at https://docs.microsoft.com/en-us/dynamics365/customer-service/configure-bot-virtual-agent, Retrieved on Jan. 29, 2022. pp. 1-13.

(Continued)

*Primary Examiner* — Beau D Spratt
*Assistant Examiner* — Reji Kartholy
(74) *Attorney, Agent, or Firm* — Invoke

(57) ABSTRACT

Techniques for modifying rules for completing requests using a conversational interface are disclosed. A conversational interface receives a user request to perform a particular function. A system extracts semantic content from the request and obtains contextual metadata associated with the request. Using the semantic content and contextual metadata, the system generates a data set of attribute values. The system determines whether the data set matches a data set of required data attributes associated with the request. If the provided data set is different than the required data set, the system determines whether to modify a set of rules associated with the request. The set of rules specifies which attribute values are required to complete the request. When the system modifies the rules associated with the request, the system also determines whether to apply the rule modification to subsequent requests by the same user and other users.

21 Claims, 8 Drawing Sheets

(56) References Cited

U.S. PATENT DOCUMENTS

| | | | |
|---|---|---|---|
| 8,224,906 B2 | 7/2012 | Mikkonen et al. | |
| 9,218,819 B1 | 12/2015 | Stekkelpak et al. | |
| 10,755,051 B2 | 8/2020 | Piernot et al. | |
| 2009/0089282 A1* | 4/2009 | Qi | G06F 16/3344 707/999.005 |
| 2015/0379029 A1* | 12/2015 | Sao | G06Q 10/10 707/639 |
| 2016/0117593 A1* | 4/2016 | London | G06F 40/30 706/11 |
| 2016/0259775 A1 | 9/2016 | Gelfenbeyn et al. | |
| 2016/0378424 A1* | 12/2016 | Kanda | G06F 3/013 700/275 |
| 2018/0144126 A1* | 5/2018 | Swinke | G06F 21/316 |
| 2018/0196653 A1* | 7/2018 | Srinivas | G06N 20/00 |
| 2020/0092293 A1* | 3/2020 | Liu | G06F 16/9535 |
| 2020/0244605 A1* | 7/2020 | Nagaraja | H04L 67/306 |

OTHER PUBLICATIONS

"Monitor AI Chatbot," Retrieved at https://juji.io/docs/reports/, Retrieved on Feb. 15, 2022, pp. 1-13.

"Using Context and System Variables," Retrieved at https://help.salesforce.com/s/articleView?id=sf.bots_service_context_system_variables.htm&type=5, Retrieved on Feb. 15, 2022, pp. 1-3.

Adamopoulou E. et al, "An Overview of Chatbot Technology," In: Maglogiannis I., Iliadis L., Pimenidis E. (eds) Artificial Intelligence Applications and Innovations. AIAI 2020. IFIP Advances in Information and Communication Technology, vol. 584, 2020, pp. 373-383.

Naik V.I. et al, "Context Aware Conversational Understanding for Intelligent Agents with a Screen," The Thirty-Second AAAI Conference on Artificial Intelligence, vol. 32, Issue 1, 2018, pp. 5325-5332.

* cited by examiner

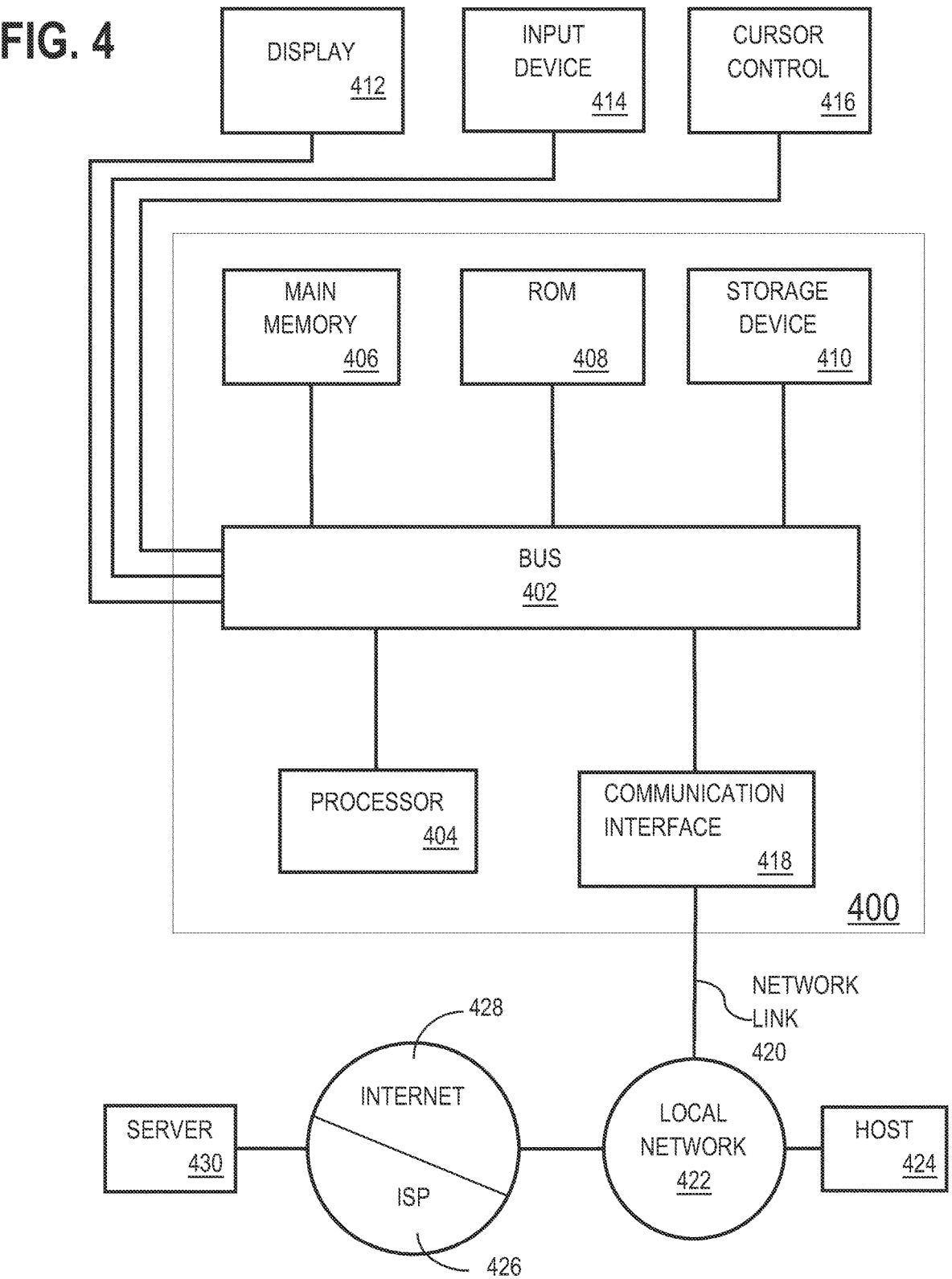

CONTEXTUALLY-ADAPTIVE CONVERSATIONAL INTERFACE

BENEFIT CLAIMS; RELATED APPLICATIONS; INCORPORATION BY REFERENCE

This application claims the benefit of Indian Provisional Patent Application 202141038662, filed Aug. 26, 2021, which is hereby incorporated by reference.

TECHNICAL FIELD

The present disclosure relates to a contextually-adaptive conversational interface. In particular, the present disclosure relates to a system for identifying context associated with a conversationally-generated request. The system acts on the request based on the identified context.

BACKGROUND

With increasing frequency, users are accessing conversational interfaces to access application data, rather than using a traditional approach that would require navigating through complex workflows.

A conversational interface may allow users to access data more efficiently than the traditional approach. For example, in traditional applications, users are expected to follow cumbersome user interface (UI) workflows to achieve their desired functionality. The traditional model for performing application functions and accessing application information does not scale effectively when there are multiple workflows within an application.

Systems that currently support conversational interfaces tend to be severely limited. Typically, a conversational interface has a predefined set of responses associated with a request. The predefined set of responses are configured when the conversational interface is deployed. For example, if a user verbally requests that a conversational interface create a calendar appointment, the conversational interface determines what information is needed, such as a date and time, and prompts the user to provide the requested information. A request provided to a conversational interface relies on a particular workflow, configured when the conversational interface was deployed, to carry out the request. However, when workflows are re-configured and customized at run-time, the interactions of the conversational interface with a user do not reflect the run-time customizations. A complex redeployment of the conversational interface is required. When customers of an application request to perform simple tasks, such as scheduling a meeting, adding a reminder, capturing a note, and uploading a file conversationally specific to their business, this inability to obtain run-time states and entities limits the utility of the conversational interface to assist the user in performing tasks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
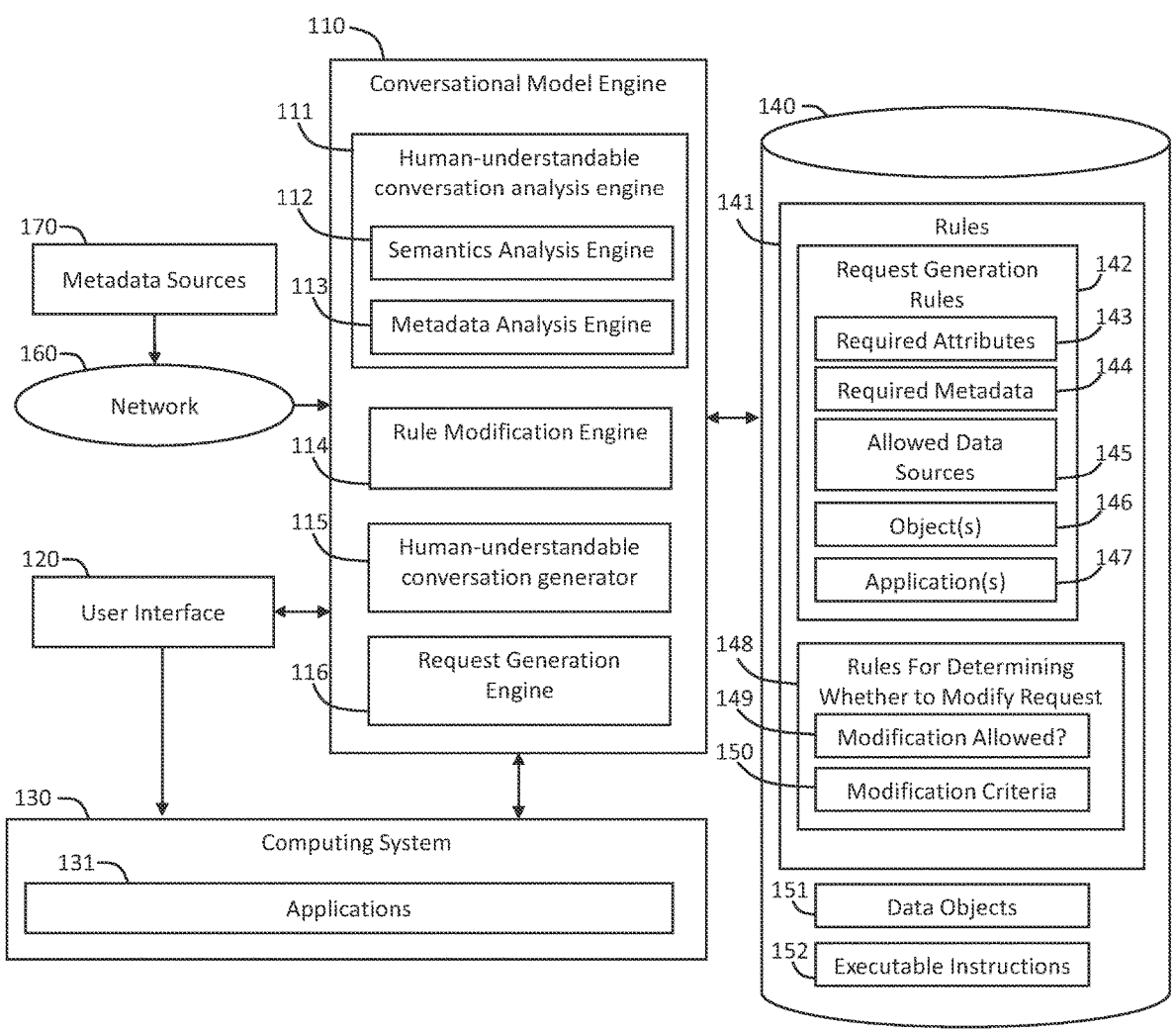
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. CONTEXTUALLY-ADAPTIVE CONVERSATIONAL INTERFACE
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A conversational interface allows users to perform tasks and access data using natural language and without navigating through a series of menus.

One or more embodiments include adapting a conversational interface to execute requests based on previous requests, contextual information, and semantic information within the request. Adapting the conversational interface may include adapting a set of rules corresponding to a type of the request. The rules may be modified, for requests of a particular type, from requiring a first set of attribute values to requiring a different, second set of attribute values.

A system receives a user request via a conversational interface. Requests include, for example, queries to access data, requests to create or modify data objects, and requests to initiate actions in one or more applications. In one embodiment, the request is an audio request, such as a user speaking words to initiate a request. The system identifies semantic content in the request to identify a request type and additional information for completing the request. For example, the request may include words, such as "generate," "appointment," "customer," "Friday," "five o'clock."

The system may also obtain contextual metadata associated with the request. For example, the system may determine the identity of a user initiating the request, a current time, and a location of the user initiating the request. The system generates a data set using the semantic information and the contextual metadata. For example, the system may generate three attribute values for three data attributes in the data set using the semantic information included in the request. The system may generate an additional two attribute values for two data attributes in the data set using semantic metadata associated with the request.

The system evaluates a set of rules associated with a request type of the request to identify a set of required data attributes associated with the request. The set of required data attributes may be data attributes for which the conversational interface requires attribute values to complete the request. For example, the system may identify a first rule that associates the words "generate" and "appointment" with a request type that executes an operation of an application to create a calendar appointment. The system may then identify additional rules specifying data attributes for which attribute values are required to create the calendar appointment—such as time, customer name, a subject of the appointment, and any products associated with the appointment. The system determines whether data set associated with the request matches a data set required by the set of rules. Specifically, the system may determine whether the data set includes an attribute value for each required attribute specified by the set of rules. If the generated data set does not match the required data set, the system determines whether to modify the set of rules associated with the request to (1) require one or more additional attribute values or (2) exclude one or more rules to omit a previously-required attribute value.

For example, the system may identify the term "research" in a request for personnel information in an organization. The system may identify "research" as being an attribute value for a data attribute "work group." The system may further determine that the data attribute "work group" was not previously among the required data attributes associated with the request for retrieving personnel information. The system may evaluate a set of rules to determine whether to add the data attribute "work group" as a required data attribute in subsequent requests for personnel information.

In an alternative embodiment, the system may identify the term "reminder" as initiating a reminder function. The reminder function may be associated with a set of data attributes including the data attributes "time" and "subject." The system may identify only an attribute value for the data attribute "time" in a data set generated based on the initiated request. The system may determine that no attribute value exists for the data attribute "subject." The system may then determine whether to modify the set of rules for performing the function "generate reminder" to omit the data attribute "subject" from among a set of required data attributes.

The system may analyze various criteria to determine whether to modify rules for performing various functions. For example, the system may allow modification of rules based on the identity of a user initiating the request. The system may automatically modify the rules for performing the request. Alternatively, the system may generate a communication via the conversation interface to ask the user whether to modify rules for subsequent requests or for additional users.

When the system modifies rules associated with requests, the system may further determine whether to apply the modifications to subsequent requests of the same type. For example, the system may determine that the user initiating the request, that may be used for applying modifications, is at a particular position in an organization. The system may modify the set of rules for the additional users in the organization. Alternatively, the system may determine that a threshold number of user requests have resulted in a particular modification to rules for a particular request type. Alternatively, the system may determine that the same rule should be modified for all users in an organization within a particular geographic area.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a conversational model engine 110. The conversational model engine 110 interacts with a user interface 120 to receive a human-understandable conversational request. For example, a user may type into a conversational model field a request, such as: "appointment," "create a new appointment," or "run an inventory." According to another embodiment, the user interface 120 includes a voice-activated assistant. The voice-activated assistant receives voice requests and initiates actions based on the voice requests. For example, a user may speak into a microphone: "create a new customer file," or "open word processor."

The system 110 includes a computing system 130. The user interface 120 may be implemented as software running on the computing system 130. Alternatively, the user interface 120 may be a separate computing system from the computing system 130. The computing system 130 includes one or more applications 131. The conversational model engine 110 includes a request generation engine 116 to generate requests to control or modify functionality of the applications 131 based on human-understandable conversations received by the conversational model engine 110. For example, in one embodiment, the computing system 130 is an enterprise system including applications to: maintain a calendar, generate tasks, generate alarms, create and store data objects associated with employees, customers, and products, manage and record financial transactions, as well as any other operations performed by the enterprise. A user may interact with the user interface 120 in a human-understandable conversation to create, delete, or modify data objects maintained by the computing system 130 and to run, stop, and modify applications supported by the computing system 130. The conversational model engine 110 identifies in a human-understandable request values that are associated with computer-implemented processes or computer-stored data objects. The conversational model engine 110 refers to a set of computer-stored rules to determine whether to execute the request or modify the set of computer-stored rules. The request generation engine 116 initiates execution of the request by a computer, such as by generating an instruction for an application running on a computer to perform a particular operation.

In one or more embodiments, interface 120 refers to hardware and/or software configured to facilitate communications between a user and the conversational model engine 110. Interface 120 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 120 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 120 is specified in one or more other languages, such as Java, C, or C++.

The system 110 includes a data repository for storing rules 141 that are analyzed and modified by the conversational model engine 110 to perform requests associated with human-understandable conversations. The data repository 140 may also store data objects 151 accessed or maintained by the computing system 130. The data repository 140 may also store executable instructions 152 accessed or maintained by the computing system 130. For example, the data repository 140 may store the software accessed by one or more servers and user computing terminals of the computing system 130 to run the applications 131 used by an enterprise.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the conversational model engine 110 and the computing system 130. Alternatively, or additionally, a data repository 140 may be implemented or executed on a computing system separate from the conversational model engine 110 and/or the computing system 130. A data repository 140 may be communicatively coupled to the conversational model engine 110 and/or the computing system 130 via a direct connection or via a network, such as the network 160.

Information describing the rules 141, data objects 149, and executable instructions 150 may be implemented across any of components within the system 100. However, this information is illustrated within the data repository 140 for purposes of clarity and explanation.

A human-understandable conversation analysis engine 111 analyzes content associated with a human-understandable conversation received via the user interface 120. A semantics analysis engine 112 analyzes semantics associated with a human understandable conversation to identify one or more attributes. For example, the semantics analysis engine 112 may analyze a conversation element "make an appointment" to identify the semantic content "appointment" associated with a calendar object and "make" which, when combined with the "appointment" semantic content, is understood to be associated with a request to create an object.

The semantics analysis engine 112 may not apply a one-to-one mapping of semantic content to rules, objects, and instructions. For example, in the context of a conversation element "make an appointment," the term "make" is understood by the semantics analysis engine 112 to be associated with a rule for creating a new appointment object in a calendar application. However, in the context of a conversation element "make a change to my profile," the term "make" is understood by the semantics analysis engine 112 to be associated with a rule for modifying attribute values in a data object associated with a user profile. In one or more embodiments, the semantics analysis engine 112 includes a conversation semantic machine learning model. The conversational model engine 110 trains the conversation semantic machine learning model using a data set comprising data points associated with conversational elements including numbers, words, phrases, sentences, and punctuation. The conversational model engine 110 also trains the conversation semantic machine learning model using tags applied to the data points to identify a type of operation, data object, and/or application associated with the data point.

In one or more embodiments, the conversational model engine 110 trains the conversation semantic machine learning model to implement language weighting. The conversational model engine 110 trains the conversation semantic machine learning model to apply different weights to different words based on how frequently the words are used in conversations. In one or more embodiments, the conversational model engine 110 trains the conversation semantic machine learning model to identify speakers based on metadata, a device used by the speaker, or a tone of the speaker's voice.

According to one or more embodiments, the conversation semantic machine learning model includes a natural language processing (NLP) algorithm. In addition, or in the alternative, the conversation semantic machine learning model may include a hidden Markov model (HMM). In addition, or in the alternative, the conversation semantic machine learning model may include N-grams by assigning probabilities to sentences or phrases in a conversation. In addition, or in the alternative, the conversation semantic machine learning model may include a neural network.

The human-understandable conversation analysis engine 110 analyzes the semantic content of a human-understandable conversation element to identify a request type associated with the semantic content and one or more rules associated with the request type. For example, the request may include words, such as "generate," "appointment," "customer," "Friday," "five o'clock." The human-understandable conversation analysis engine 110 may analyze the semantic content to identify the request as a request to create an appointment-type data object in a calendar application.

The human-understandable conversation analysis engine 110 identifies one or more request generation rules 142 associated with a particular request type. The request generation rules 142 specify (a) required attributes 143 that are required to perform the request, (b) any metadata 144 that may be required to perform the request, (c) any data sources that may be accessed to obtain the metadata 145, (d) an object 146 affected by the request, and (e) an application 147 affected by the request.

The conversational model engine 110 may obtain contextual metadata associated with the request. For example, the system may determine the identity of a user initiating the request, a current time, and a location of the user initiating the request. The conversational model engine 110 may obtain the contextual metadata from metadata sources 170, such as servers connected to the conversational model engine 110 via a network 160. The conversational model engine 110 may obtain the contextual metadata from the computing system 130 running applications 131 and from the data repository 140. In one embodiment, conversational model engine 110 analyzes a field in a request generation rule 142 for the identified request-type to determine which sources may be used to obtain contextual metadata. For example, the "allowed data sources" field 145 for a request type "generate appointment object" may include "local terminal clock," "local terminal user ID," and "user profile data object" as metadata sources from which the conversational model engine 110 requests contextual metadata. In one or more embodiments, the obtained metadata is in a format that is not readily understandable by a human, such as in digital code (binary, hexadecimal, etc.) but that is readable by a computer. For example, the metadata representing a local terminal clock may be in a specified number of bytes in binary format. An application running on a computer may convert the binary data into display data in the form of a human-understandable clock. In addition, applications may use the binary data in its binary form to perform various functions, such as applying timestamps to stored data. The metadata includes any data associated with a human-understandable conversation that is not included in the human-understandable conversation.

The conversation model engine 110 generates a data set using the semantic information and the contextual metadata. For example, the conversational model engine 110 may identify five attributes that are "required attributes" 143 for an identified request-type. The conversational model engine 110 generates three attribute values for three data attributes in the data set using the semantic information included in the request. The conversational model engine 110 may generate an additional two attribute values for two data attributes in the data set using semantic metadata associated with the request.

The conversational model engine 110 evaluates a set of rules 141 associated with a request type of the request to identify a set of required data attributes 143 associated with the request. The set of required data attributes 143 may be data attributes for which the conversational model engine 110 requires attribute values to complete the request. For example, the system may identify a first rule that associates the words "generate" and "appointment" with a request type that executes an operation of an application to create a calendar appointment. The system may then identify additional rules specifying data attributes for which attribute values are required to create the calendar appointment—such as time, customer name, a subject of the appointment, and any products associated with the appointment. The system determines whether data set associate with the request matches a data set required by the set of rules. Specifically, the system may determine whether the data set includes an attribute value for each required attribute specified by the set of rules.

If the generated data set does not match the required data set, a rule modification engine 114 determines whether to modify the set of rules associated with the request to (1) require one or more additional attribute values or (2) modify one or more rules to omit a previously-required attribute value. For example, the rule modification engine 114 may refer to a set of rules 148 for determining whether to modify a request. The rules 148 may specify, for a particular request type, whether a modification is allowed 149. The rules 148 may include modification criteria 150 specifying when modification is allowed. For example, the modification criteria 150 may include: a position of a user initiating a request in an organization; an authorization level of the user; a number of users initiating requests to modify a set of rules in the same way; and a geographical region of the user.

The conversational model engine 110 includes a human-understandable conversation generator 115 to generate human-understandable responses to requests. For example, the human-understandable conversation generator 115 may generate words, phrases, and sentences in a human-understandable language via a speaker or via text. The conversation generator 115 may generate prompts when the conversational model engine 110 determines that a request of a particular request type is missing required attribute values or includes extra attribute values that have not been previously associated with the request type. For example, the conversation generator 115 may include a machine learning model trained to generate human-understandable conversation based on attribute values associated with a request.

The conversational model engine 110 includes a request generation engine 116. Based on determining that the conversational model engine 110 has received sufficient attribute values to perform a request, the request generation engine 116 initiates the request. For example, the request generation engine 116 may send an instruction to an application 131 with the required attribute values to initiate a function of the application 131, such as generating a new data object, modifying a data object, deleting a data object, or performing another function of the application.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a conversational model engine 110 refers to hardware and/or software configured to perform operations described herein for a conversational model engine 110. Examples of operations for adapting a conversational interface to adapt requests based on previously-received requests are described below with reference to FIGS. 2A and 2B.

In an embodiment, a conversational model engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Contextually-Adaptive Conversational Interface

Figure 2A:
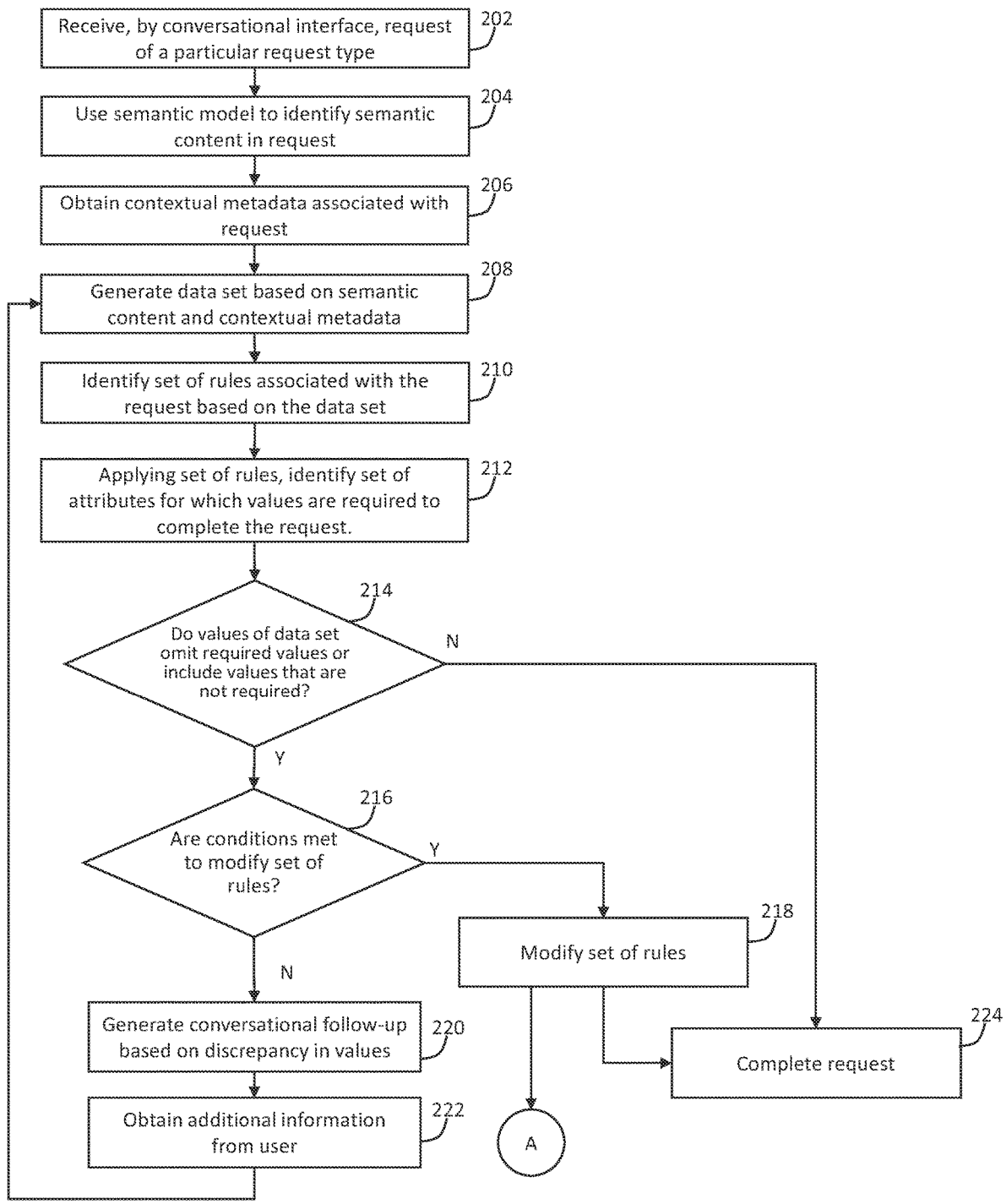
FIGS. 2A and 2B illustrate an example set of operations for adapting a functionality of a conversational interface in accordance with one or more embodiments.
Figure 2B:
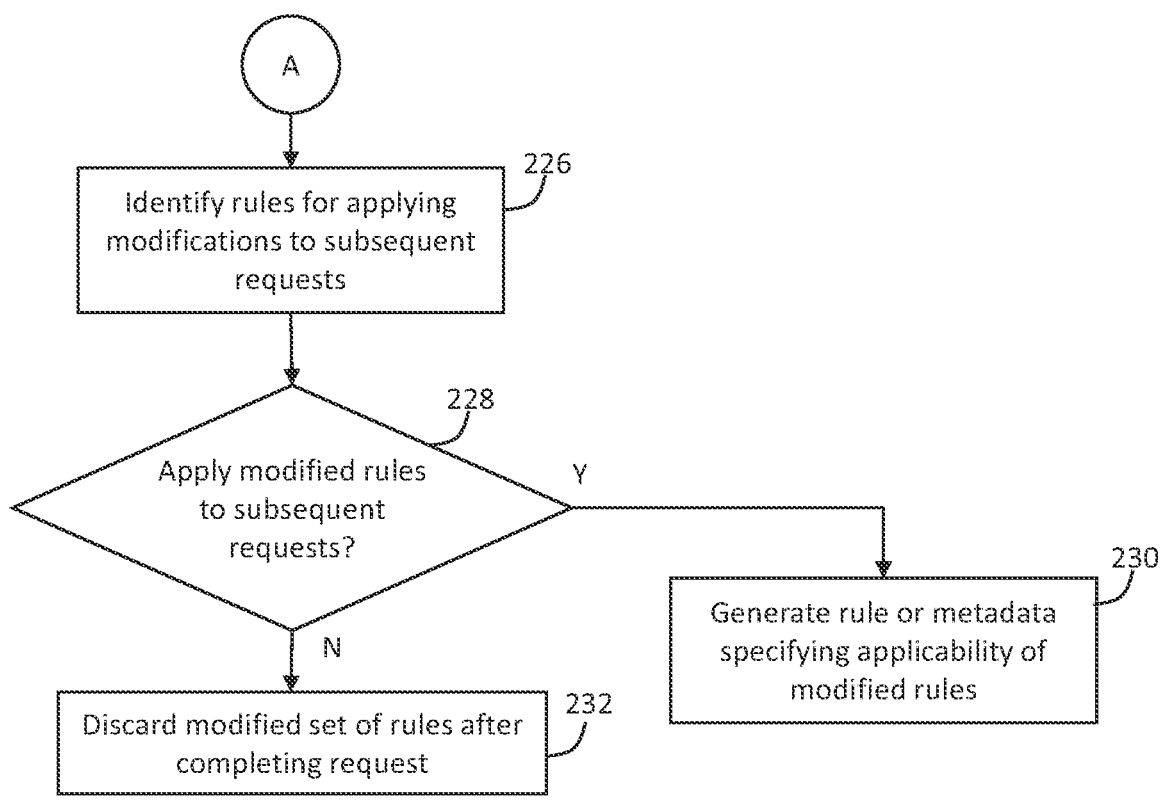

FIGS. 2A and 2B illustrate an example set of operations for adapting a conversational interface in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A conversational interface receives a request of a particular request type a system 100 in accordance with one or more embodiments (Operation 202). The conversational interface may be an interface that receives audio input, such as a microphone input for an assistant application. Additionally, or in the alternative, the conversational interface may receive conversational text as input. For example, while a traditional interface may require a user to navigate a series of menus to perform a function to create an appointment in an application, the conversational interface may receive a typed input to "create appointment in my calendar at 1 p.m. on Friday to meet with the sales team." Alternatively, the conversational interface may detect the words "set appointment," "make appointment for Friday," or "new appointment with sales team" via a microphone input.

A system uses a semantic model to identify semantic content in the request (Operation 204). For example, the system may apply a word-recognition machine learning model to the request (e.g., an audio input or recording) to isolate words in the audio input. The system may then apply a machine learning model to identify semantic content in text to identify the semantic content in the set of words, numbers and/or symbols identified in the set of words. An example of a type of machine learning model applied to input data—whether processed audio data or text input data—is a sequence-to-sequence (seq-2-seq) type machine learning model.

In one or more embodiment, the system identifies a request type based on attribute values associated with request types, even if the specific attribute value is not among the words or values expressly included in the human-understandable request. For example, the semantic model may identify a particular application, executed on a computing system, that a user uses to generate appointments, even if the user does not expressly use the name of the application in the request. For example, the request may include the words "make a new appointment." The semantic model identifies semantic content "make", "new", and "appointment" associated with a request type, "create appointment." The system further identifies the application "CalendarApp" for performing the request of the request type "create appointment." According to one embodiment, the system identifies the particular application associated with the request type by referring to a set of rules associated with the request type, as discussed in further detail below.

The system obtains contextual metadata associated with the request (Operation 206). Contextual metadata includes any context data associated with the request that is not generated directly from the user input. For example, upon receiving a request via the conversational interface, the system may obtain contextual metadata including: an identity of a requesting user, personnel information associated with the user (such as a work group associated with the user, an organization to which the user belongs, a position in the organization of the user, and an authorization level of the user), a time of the request, a geographic location of the user, and environmental information (such as weather). According to one embodiment, the contextual metadata is stored in a computer-readable format that is not readily understandable by a human. For example, the system may store user identification information as binary data processed by a hardware processor in byte-sized segments.

According to one embodiment, the system identifies a request type associated with human-understandable conversational input based on semantic content in the human-understandable conversational input. The system then refers to a set of rules associated with the request type to identify sources from which the system is permitted or required to obtain metadata associated with the request. For example, a rule associated with one request type may direct the system to obtain user profile information from a particular database. Another rule associated with another request type may prevent the system from obtaining the user profile information form the particular database. Yet another rule associated with another request type may direct the system to access time or geographic data from a local device or from a server connected to a local device via a network.

Based on (1) the semantic information included in the request, and (2) the contextual metadata, the system generates a data set associated with the request (Operation 208). The data set includes a set of attributes (such as "user identity," "location," "request type") and values for the respective attributes (such as "Employee1," "United States, Mid-Atlantic Region" and "Generate Sales Order.").

The system identifies a set of rules associated with the request (Operation 210). For example, the system may identify a request type in the data set. The system may match the request type to a set of one or more rules specifying required data to complete the request. In particular, the set of rules specifies data attributes for which an attribute value is required in one or both of the semantic information in the request or in the contextual metadata associated with the request. Alternatively, the system may identify a group of potential request types based on the data set. The system may generate a communication via the conversational interface to request additional information from a user to identify a particular request type the user desires to initiate.

While FIGS. 2A and 2B illustrate an embodiment in which the system obtains contextual metadata prior to identifying a set of rules associated with a request, according to one or more embodiments, the system may perform the operation of identifying one or more sets of rules associated with a request prior to and/or after obtaining contextual metadata. For example, the system may identify a request based on semantic content in a human-understandable input. The system may identify a set of rules associated with the request type to identify sources from which to obtain contextual metadata. The system may update the request type based on the combination of the identified semantic content and the obtained contextual metadata. In addition, or in the alternative, the system may generate the data set for initiating a request of the request type based on the combination of the identified semantic content and the obtained contextual metadata.

The system applies the set of rules to identify a set of data attributes for which the system requires attribute values to complete requests of the identified request type (Operation 212). For example, the system may identify a set of rules specifying that a request of the type "Generate Sales Order" requires attribute values for the data attributes "User Identity," "Location," "Request Type," "Order Date," "Product Type," "Price," "Delivery Address," and "Estimated Delivery Date." The system may further identify rules allowing for optional entry of attribute values for data attributes "Salesperson," "Payment Received," and "Supervisor Authorization."

In one embodiment, the system associates the request with an operation to generate an instance of a data object. The request type may be associated with an object type. The object type may be associated with an object definition. The object definition may be obtained from a schema. For example, an organization may obtain a database schema from a data repository. The database schema may include definitions for various objects. The definitions may include an object name and one or more data attributes for which attribute values are required to generate an instance of the object of the particular object type. The definitions may further include data attributes that are optional, or that may be provided but are not required to generate an instance of the object of the particular object type. The attribute values may be stored in fields of the instance of the object. An application may perform operations using the attribute values stored by the instance of the object.

In another embodiment, the system associated the request with an operation to perform a function using an application executing on a computing system. For example, the request type may be associated with an "audit" function executable by a financial application running on a computer system to audit specified accounts or invoices. Additional examples include operations to backup data, initiate a graphical user interface (GUI), execute specified software code, or initiate real-time communications with another device (such as via voice-over-IP (VOIP)) or instant messaging.

The system determines whether (1) the data set omits at least one attribute value that is identified as being a required value by the set of rules associated with the request, or (2) the data set includes at least one additional attribute value that is not required by the set of rules associated with the request (Operation 214). For example, the system may determine that the semantic information included in the request included attribute values for three required data attributes, and the semantic metadata obtained based on the request included values for another three required data attributes. The system may determine that the attribute values in the data set match the required data attributes when the data set includes values for each required data attribute identified by the set of rules, without including additional data attribute values. In an embodiment in which the set of rules associated with a request specifies both a set of required data attributes and optional data attributes, the system may determine that the attribute values in the data set do not match the required data attributes specified in the set of rules when the data set includes at least one attribute value that is neither associated with a required data attribute nor with an optional data attribute.

If the system determines that the attribute values in the data set do not match a required set of data attributes, either by omitting a required attribute value or including an attribute value that is not required, the system determines whether conditions are met to modify the set of rules (Operation 216). For example, the system may determine that if the user initiating the request has a particular position within an organization, such as an organizational unit manager, and if the request is associated with operations of the organization unit, then the system may modify the set of rules based on the request. For example, if the data set omitted an attribute value for a required data attribute, the system may modify the set of rules to omit the required data attribute from the set of required data attributes. Alternatively, if the data set included an extra attribute value that was not an attribute value for one of the required data attributes, the system may modify the set of rules to specify an additional data attribute associated with the extra attribute value in the data set.

The system may analyze a variety of criteria to determine whether the conditions are met to modify the set of rules. Examples of criteria that may be analyzed to determine whether to modify the set of rules include: the identity of the user initiating the request, the position of the user in an organization, the type of request, the particular data attribute to be added or omitted from the set of required data attributes, a geographic region of the user initiating the request, a number of additional users who have initiated the request with a similar data set that did not match a set of required data attributes, and a number of user requests to modify the set of rules.

In one embodiment, the set of rules may specify a first sub-set of data attributes for which attribute values are required that may not be modified by users. The set of rules may specify a second sub-set of data attributes for which attribute values are required that may be modified by users.

In an embodiment in which the request results in generating an instance of a data object, modifying the set of rules includes modifying the fields required to generate the instance of the data object.

In one embodiment, the system generates a conversational communication via the conversational interface to request user input regarding modifying the set of rules. For example, the system may ask the user if the user would like to modify the set of rules based on the semantic data provided by the user in the conversational request from the user. In one embodiment, the user may indicate in the initial request via the conversational interface an intent to modify the set of rules. For example, the user may speak: "Add a 'product type' field to requests to generate an invoice." Accordingly, the request may be to modify an invoice-type data object, without generating a new invoice. Alternatively, a user may speak: "Generate an invoice and include a field for the product type." Accordingly, the request may be to generate an invoice and to simultaneously modify the invoice-type data object.

If the system determines that the conditions are met to modify the set of rules, the system modifies one or more rules in the set of rules (Operation 218). For example, the system may modify the set of rules to omit a previously-required data attribute. Alternatively, the system may modify the set of rules to add a previously-omitted data attribute. Other example modifications include: applying a specified algorithm to a specified attribute value, modifying a particular rule only for a particular subset of users, modifying a particular rule only for users within a particular geographic region, modifying a particular rule only at a certain time or date, modifying a name for a particular type of request, modifying the conditions for allowing modification of rules, and modifying the conditions that determine how broadly to apply rule modifications.

According to one or more embodiments, the system modifies the set of rules by keeping an initial set of rules intact and creating a new set of rules. The rules may include metadata or fields identifying a particular group of users for which the initial set of rules applies, and another group of users to which the new, modified, set of rules applies. For example, the system may apply the new, modified, set of rules to the requesting user. The system may apply the initial set of rules to requests initiated by all other users other than the requesting user.

If the system determines that the conditions have not been met to modify the set of rules, the system generates a conversational communication via the conversational interface to request further user information (Operation 220). For example, if the semantic content provided in the initial user request omits required attribute values for required data attributes, the system may generate a follow-up communication requesting the required information. In addition, or in the alternative, if the semantic content provided by the user in the initial user request included attribute values that did not belong to the set of data attributes required to complete a request, the system may inform the user that the provided attribute values are not required to complete the request. Alternatively, the system may complete the request (Operation 224) without informing the user that provided attribute values are not required to complete the request. For example, a request type may include three required attribute values, and the system may identify the three required attribute values and one additional attribute value in a human-understandable conversation associated with the request. The system may complete the request using the three required attribute values and disregarding the one additional attribute value.

The system obtains additional information from the user in response to the system-generated communication (Operation 222). For example, if the system communicates that a required attribute value is missing from the initial user request, the user may provide, via the conversational interface, the additional attribute value. In addition, or in the alternative, the user may direct the system, via the conversational interface, where the system look to obtain the required attribute. For example, the system may determine that a request to generate a new customer profile lacks a required address value for the customer. The user may direct the system via the conversational interface to: "Look in my email box for the address for Products Inc." Accordingly, the system may perform a search operation of an identified data source to obtain the indicated attribute values. The system may then update the data set based on the additional semantic content and based on the previously-obtained metadata (Operation 208). In addition, the system may obtain additional metadata based on the additional user communication with the system. For example, if the system communicates to the user that the request type indicated by the user requires a product name, and if the user provides a product name, the system may obtain additional metadata associated with the product, such as manufacturing information, sales information, and product specifications.

If the attribute values in the data set match the required data attributes (Operation 214), or upon modifying the set of rules (Operation 218), the system completes the requested (Operation 224). For example, the system may generate an instance of a data object that includes the provided attribute values for particular data attributes. The system may further execute one or more operations by one or more applications on the instance of the data object to complete the request. For example, a request may result in generating a calendar entry on an electronic calendar, generating a reminder including particular content, generating, modifying, or deleting one or more documents or files, running a particular application, initiating a textual, electronic, or audio communication via a communication device, playing a stored media file, streaming a media file via a network, or initiating a media recording operation.

Referring to FIG. 2B, when a set of rules has been modified (Operation 218), the system analyzes an additional set of rules specifying when to apply rule modifications to subsequent requests of the same request type to determine whether to apply the rule modification to subsequent requests of the same request type (Operation 226). The rules specifying when to apply rule modifications to subsequent requests may specify whether a rule modification should be applied to future requests from (1) the same user, or (2) one or more additional users. The rules specifying when to apply rule modifications to subsequent requests may further specify a particular subset of users for which, when a user in the subset of users generates a request of the same type, the system applies the modified rule. For example, if a manager in an organization modifies the request type "Generate Sales Order," the rules may specify that, based on the user's position within the organization, the modified rule will be applied to subsequent requests generated by any user in the same organization. The rules may further specify that the modified rule would not be applied to requests generated by other users in other organizations. Instead, the rules may specify that the unmodified rule should be applied to requests of other users of other organizations. According to an alternative example, the rules may specify that a rule modification initiated by one user to modify required attribute values for a "generate alarm" request type will be applied only to the requesting user in subsequent requests, and not to additional users.

The rules specifying when to apply rule modifications to subsequent requests of the same request type may include particular criteria for when to apply modified rules to subsequent requests. Examples of criteria include: a position of the requestor in an organization, an authorization level of the requestor, a number of additional users initiating requests to modify the set of rules in the same way as the requestor, a geographical region of the requestor and the additional users, and an organizational relationship of additional users to the requestor.

Based on the rules for applying rule modifications to subsequent requests, the system determines whether the present rule modifications are to be applied to subsequent requests (Operation 228). In particular, the system determines, based on the rules for applying rule modifications to subsequent requests of the same request type, whether the present rule modification is to be applied to subsequent requests, of the same request type, by the same user and any additional users.

If the system determines that the modified set of rules should be applied to subsequent requests by the present requestor and/or one or more additional users, the system may generate a rule, modify a rule, or include metadata together with the modified set of rules, specifying the set of users for which the modified rule should be applied (Operation 230). For example, the system may store metadata together with the modified set of rules and the original, unmodified set of rules, specifying the sets of users to which the modified set of rules and the original set of rules apply.

If the system determines that the present rule modification should not be applied to subsequent requests, the system may discard the modified set of rules after completing the request (Operation 232). For example, the system may apply a modified set of rules to include a new attribute value to a particular task. However, subsequent to generating the task, the system may discard the rule. When any user subsequently initiates a future request of the same type, the system may apply the unmodified set of rules to determine which attribute values are required to perform the request.

One or more embodiments improve functionality of a conversational interface by allowing modification of rules for creating, modifying, and deleting, at run-time and via the conversational interface, data objects and workflows. One or more embodiments improve functionality of a conversational interface by allowing modification of rules, at run-time and via the conversational interface, for initiating operations of a computing system. The conversational interface receives human-understandable input, generates computer-understandable values based on the human-understandable input, and applies a set of rules for determining: (a) whether required values are included in the request, and (b) whether the request may be used to modify one or more rules associated with a request-type. The conversational interface controls operations of a computer based on the human-understandable input.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A to 3D illustrate operations performed by a conversational interface 300, such as the system 100 illustrated in FIG. 1. The conversational interface 300 receives a human-understandable input 301, such as a voice input: "Assistant, create a new employee record for a part-time employee, Bill Williams." The conversational interface 300 applies a semantics recognition machine-learning model 302 to the voice input to identify semantic content within the voice input. The semantics recognition machine-learning model 302 identifies the words and phrases: "create," "employee record," "part-time," and "Bill Williams" (303). The conversational interface 300 recognizes the identified words as attribute values associated with a particular request type to create a new employee record (304).

Based on the identified request type, the conversational interface 300 analyzes a rule 305 associated with the request-type to identify any metadata sources from which the conversational interface 300 may obtain metadata to carry out the request. The rule 035 indicates that the conversational interface 300 may obtain metadata associated with a user's identity from a voice recognition application. In addition, the conversational interface 300 may access data in a company directory to identify a user's department, a user's authority, and a user's location.

The conversational interface 300 accesses the voice recognition application and the company directory to obtain a set 306 of metadata identifying the requestor, department, authority level, and location. The conversational interface 300 combines the data set 303 generated by the semantics recognition machine-learning model 302 with the metadata data set 306 to generate a combined data set 307.

Figure 3A:
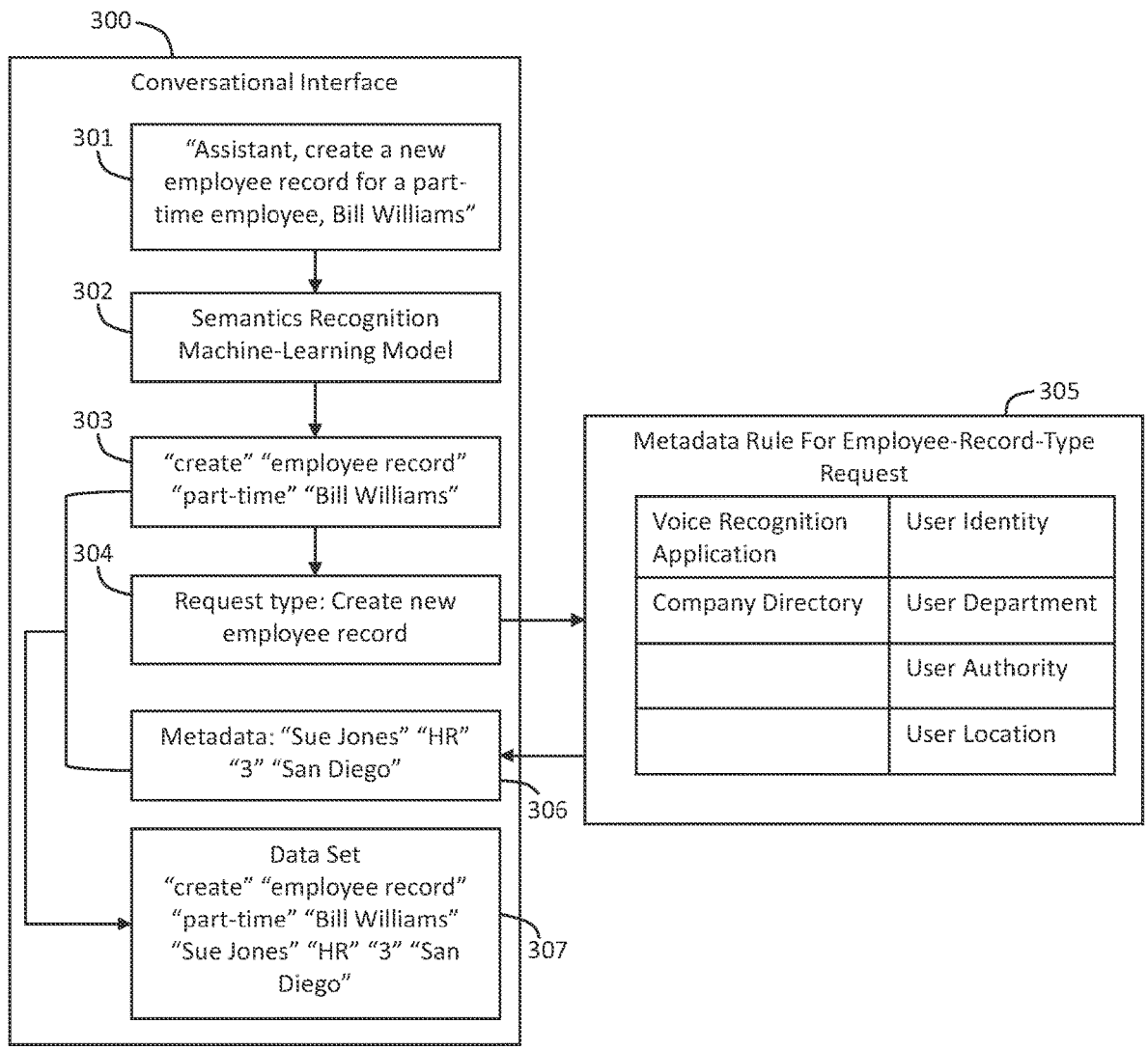
FIGS. 3A to 3D illustrate an example embodiment of adapting a functionality of a conversational interface.
Figure 3B:
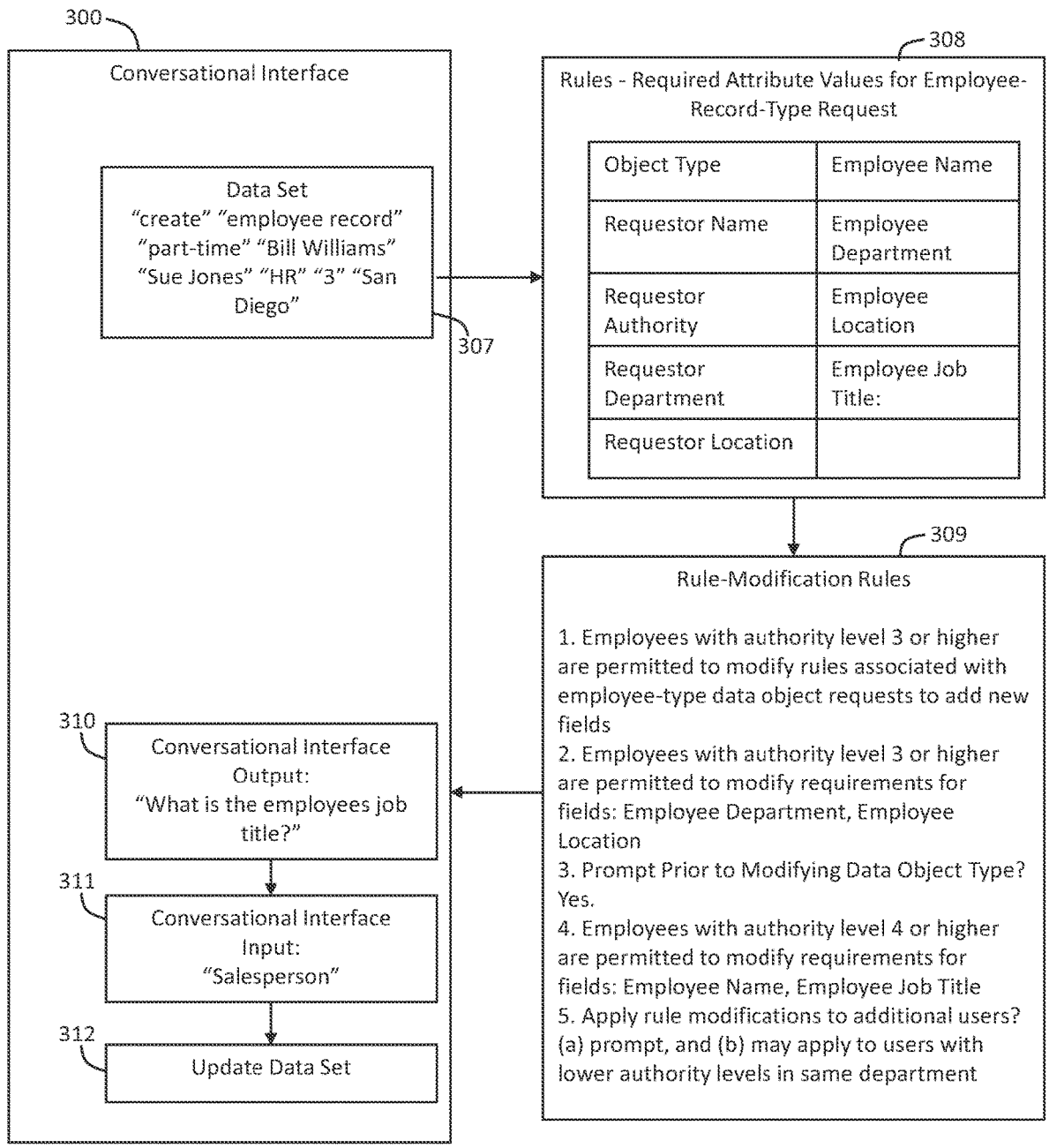

Referring to FIG. 3B, the conversational interface 300 identifies a set of rules 308 specifying required attribute values to execute an employee-record-creation-type request. The required attribute values include values for "object type," "requestor name," "requestor authority," "requestor department," "requestor location," "employee name," "employee department," "employee location," and "employee job title."

The conversational interface 300 compares the data set 307 to the set of attribute values identified in the rule 308 to determine whether the values in the data set 307 correspond to the required attribute values identified in the rule 308. The conversational interface 300 determines that the attribute values do not correspond. For example, the data set includes an attribute value "part-time" that does not correspond to any required attribute in the rule 308. In addition, the rule includes attributes "employee department," "employee location," and "employee title" that are not associated with attribute values in the data set 307.

The system analyzes a set of rules 309 for specifying when a user may modify rules, objects, and workflows at run-time. In the embodiment illustrated in FIG. 3B, the rules 309 specify that an employee having an authority level of 3 or higher is permitted to modify rules associated with employee-type data object request to add new fields. The employees with an authority level of 3 or higher may also modify rules specifying which attribute values are required to execute requests of an employee-record-creation type. The rules 309 further specify that the conversational interface 300 should prompt a user prior to modifying rules. The rules 309 further specify that employees with an authority level of 4 or higher may modify particular requirements for attribute values that are required to execute a request. In addition, the rules 309 specify that modifications should be applied to additional users in a same department as the requestor if the users have a lower authority level. The rules 309 further direct the conversational interface 300 to prompt a requestor prior to applying rule modifications to additional users.

Based on the rules 309 indicating that the attribute value for "employee job title" is a required attribute value that cannot be modified by a user having an authority level less than 4, the conversational interface 300 prompts the user for a job title for the employee "Bob Williams" (310). The conversational interface 300 receives a voice input "salesperson" (311) and updates the data set with the attribute value "salesperson" (312).

Figure 3C:
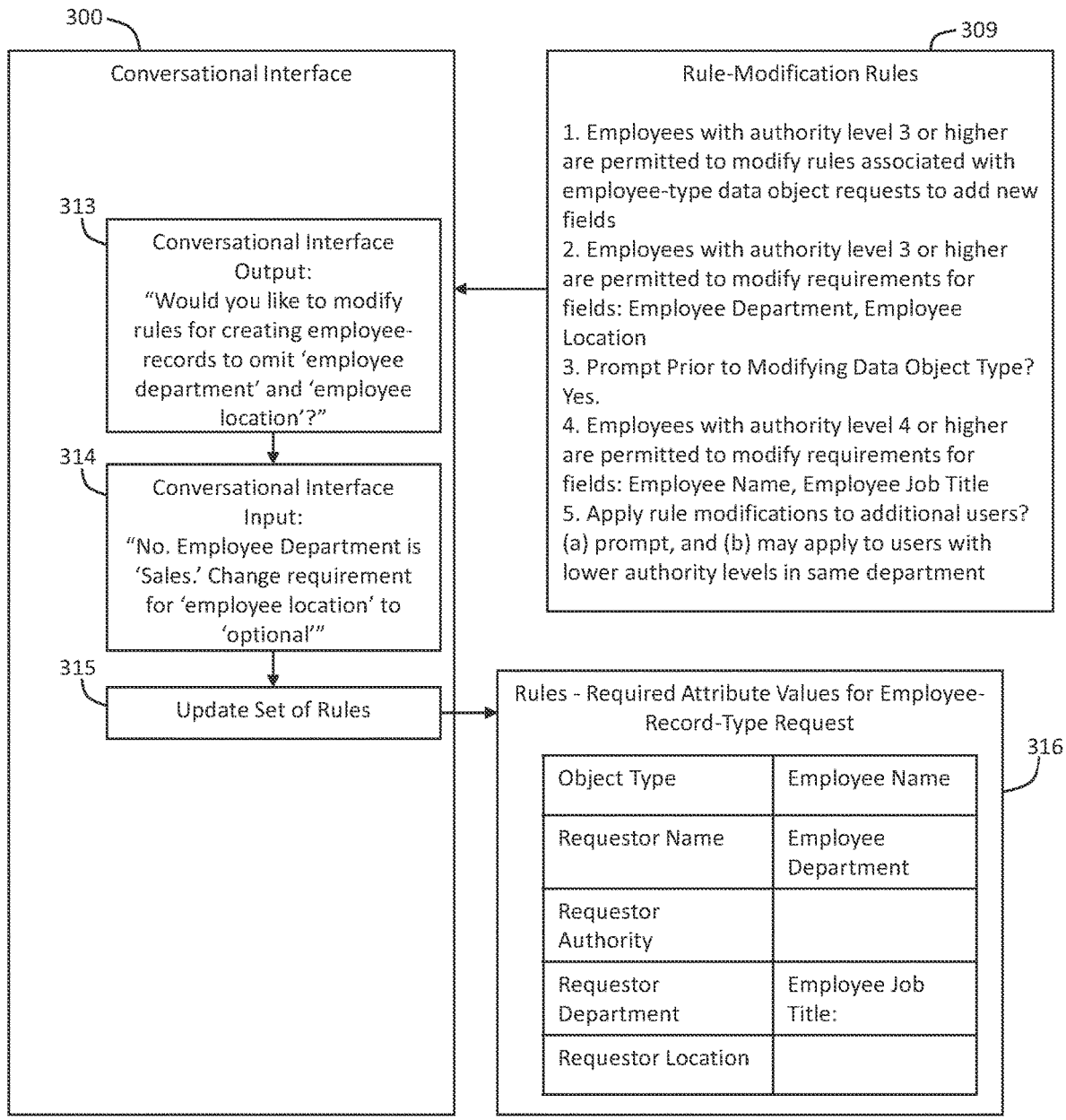

Referring to FIG. 3C, based on the rules 309 directing the conversational interface 300 to prompt a user prior to modifying a rule that the user has authority to modify, the conversational interface 300 generates a prompt 313 asking the user whether the user would like to modify the rules to omit the requirements associated with the attributes "employee department" and "employee location." The conversational interface 300 receives a voice input 314 including an attribute value "sales" for the employee department. The voice input 314 also includes a request to change a rule specifying required information to omit "employee location" as a required attribute value.

Based on receiving the voice input 314 to change the rule 316, the conversational interface 300 updates the set of rules (315). In the example illustrated in FIG. 3C, the rule 316 specifying required attribute values for an employee-record-creation-type request is updated to omit the attribute "employee location" as a required attribute value. According to one embodiment, the modified rule 316 replaces the previous version of the rule 308 illustrated in FIG. 3A. In another embodiment, the modified rule 316 is generated as a new rule that is applied to a predefined set of users. For example, the conversational interface 300 may analyze the modified rule 316 based on requests from the user presently-requesting the rule modification. The conversational interface 300 may analyze the original rule 308 in response to requests from additional users. Alternatively, the conversational interface 300 may analyze the modified rule 316 when any future request is received to create an employee record.

Figure 3D:
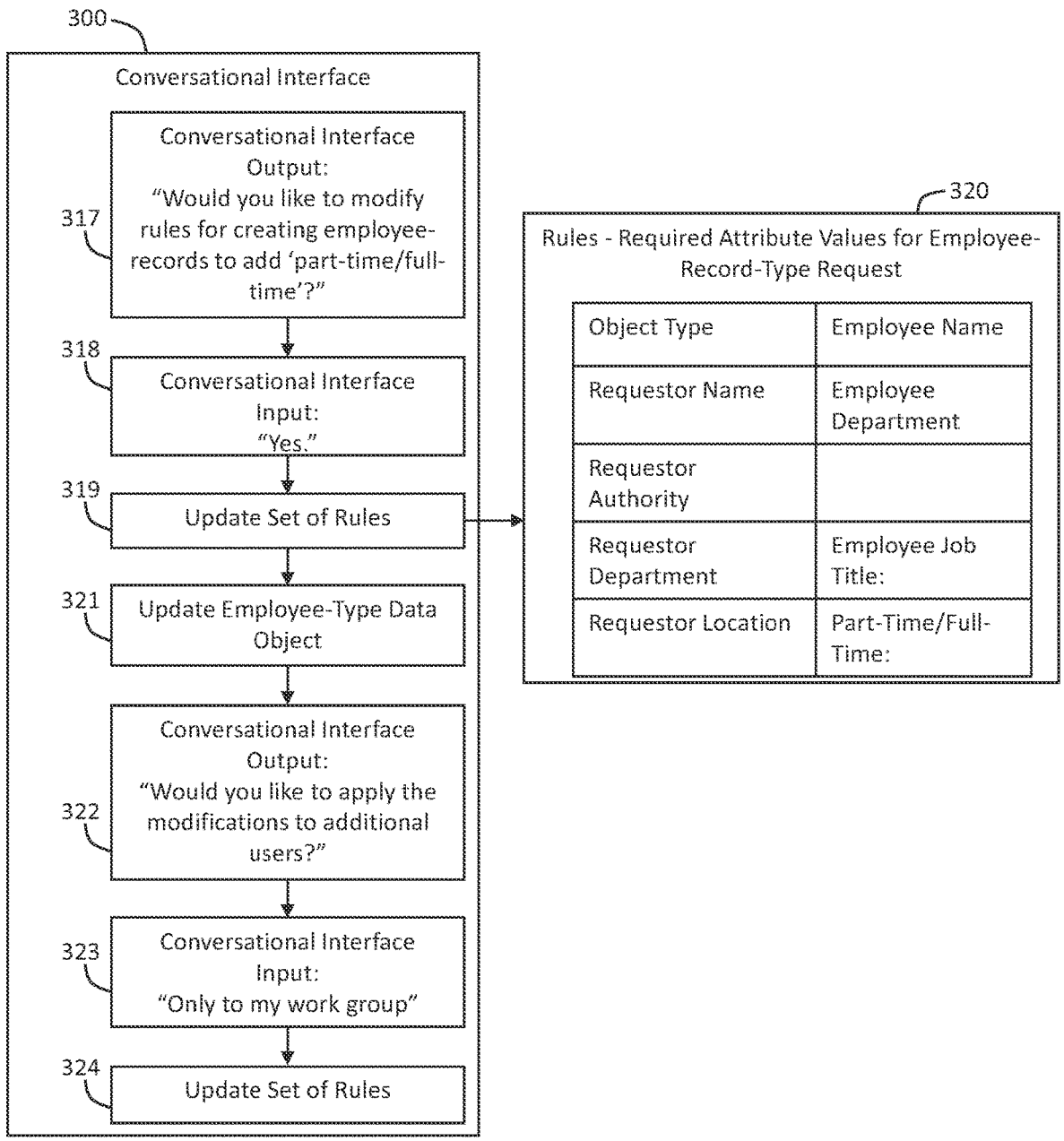

Referring to FIG. 3D, based on the rules 309 directing the conversational interface 300 to prompt a user prior to modifying a rule that the user has authority to modify, the conversational interface 300 generates a prompt 317 asking the user whether the user would like to modify the rules to add an attribute "part-time/full-time" to the attributes for which values are required to perform an operation to create an employee record. Based on receiving a user input 318 in the affirmative, the conversational interface 300 modifies the set of rules 320, based on the previously-modified set of rules 316, to include a field associated with a "part-time/full-time" attribute value.

In addition, the conversational interface 300 may determine that the data object associated with the type "employee record" does not include a field for "part-time/full-time." The conversational interface 300 may update the data object 321 to include a new field associated with an attribute "part-time/full-time."

Based on the rule 309 directing the conversational interface 300 to prompt a requestor prior to applying rule modifications to additional users, the conversational interface 300 generates a prompt 317 inquiring whether the requestor would apply the modifications to additional users. Based on an input 323 directing the conversational interface 300 to apply the modified rule only to a subset of employees in the same workgroup as the requestor, the conversational interface 300 updates the set of rules (324) to indicate that the modified rules 320 are to be applied to users in the same workgroup as the requestor. When the requestor or users in the requestor's work group initiate future requests to create an employee record, the conversational interface 300 applies the modified set of rules 320 to respond to the request or carry out the request. When other users request to create an employee record, the conversational interface 300 applies the original set of rules 308 to respond to the request or to carry out the request.

5. Computer Networks and Cloud Networks

In one or more embodiments, the system 100 may be embodied in, or connected to, a computer network that provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API). According to one embodiment, multiple clients may access a conversational model engine 110 via the network.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:
receiving, via a conversational interface, a first request of a first request type;

applying a first set of rules to the first request to determine that the first request comprises values for each of a first set of required attributes corresponding to the first request type, wherein the first request further comprises a value for a particular data attribute that is not included in the first set of required attributes corresponding to the first request type;

responsive at least to determining that the first request comprises values for each of the first set of required attributes, executing the first request;

responsive at least to determining that the first request comprises the value for the particular data attribute:
determining whether to modify the first set of rules to generate a second set of rules including a second set of required attributes for the first request type;
responsive to determining whether to modify the first set of rules to generate the second set of rules, modifying the first set of rules to generate the second set of rules that specify the second set of required attributes for the first request type, wherein the second set of required attributes include the particular data attribute that was not included in the first set of required attributes;

receiving, via the conversational interface, a second request of the first request type;

applying the second set of rules to the second request to determine that the second request comprises values for each of the second set of required attributes corresponding to the first request type; and responsive at least to determining that the second request comprises values for each of the second set of required attributes, executing the second request.

2. The computer-readable medium of claim 1, wherein the operations further comprise:
responsive to generating the second set of rules, applying a third set of rules specifying whether to apply the second set of rules responsive to subsequent requests, wherein the third set of rules specifies whether to apply the second set of rules to: (a) only a first user initiating the first request, or (b) both the first user initiating the first request and a set of additional users.

3. The computer-readable medium of claim 2, wherein the third set of rules includes criteria for specifying whether to apply the second set of rules, the criteria including one or more of:
a position of the first user in an organization including the set of additional users;
an authorization level of the first user;
a number of users initiating requests to modify the first set of rules in the same way;
a geographical region of the set of additional users; and
an organizational relationship of the set of additional users to the first user.

4. The computer-readable medium of claim 1, wherein applying the first set of rules to the first request comprises:
identifying, using a semantic-recognition model, semantic content of the first request;
identifying contextual metadata associated with the first request;
generating a first data set based on the semantic content and the contextual metadata, wherein generating the first data set includes extracting from the contextual metadata at least one attribute value for at least one data attribute among the first set of required attributes; and
applying the first set of rules to the first data set.

5. The computer-readable medium of claim 4, wherein the operations further comprise:
based on the semantic content of the first request, identifying the first request type of the first request;
analyzing a third set of rules associated with the first request type to identify a set of metadata sources from which to obtain the contextual metadata; and
obtaining the contextual metadata from the set of metadata sources.

6. The computer-readable medium of claim 1, wherein the operations further comprise:
identifying a data object type associated with the first request;
responsive to determining that the data object type does not include the particular data attribute: adding the particular data attribute to the data object; and
responsive to receiving the second request of the first request type: generating an instance of the data object type including a field associated with the particular data attribute.

7. The computer-readable medium of claim 1, wherein applying the second set of rules to the second request is performed responsive to determining that the second request meets a particular criterion specified in a third set of rules, the third set of rules specifying whether to apply the second set of rules responsive to subsequent requests,
wherein the operations further comprise:
subsequent to generating the second set of rules, receiving, via the conversational interface, a third request of the first request type; and
responsive to determining that the third request does not meet the particular criterion specified in the third set of rules: applying the first set of rules to the third request to determine that the third request comprises values for each of the first set of required attributes corresponding to the first request type.

8. A method, comprising:
receiving, via a conversational interface, a first request of a first request type;
applying a first set of rules to the first request to determine that the first request comprises values for each of a first set of required attributes corresponding to the first request type, wherein the first request further comprises a value for a particular data attribute that is not included in the first set of required attributes corresponding to the first request type;
responsive at least to determining that the first request comprises values for each of the first set of required attributes, executing the first request;
responsive at least to determining that the first request comprises the value for the particular data attribute:
determining whether to modify the first set of rules to generate a second set of rules including a second set of required attributes for the first request type;
responsive to determining whether to modify the first set of rules to generate the second set of rules, modifying the first set of rules to generate the second set of rules that specify the second set of required attributes for the first request type, wherein the second set of required attributes include the particular data attribute that was not included in the first set of required attributes;
receiving, via the conversational interface, a second request of the first request type;
applying the second set of rules to the second request to determine that the second request comprises values for each of the second set of required attributes corresponding to the first request type; and responsive at least to determining that the second request comprises values for each of the second set of required attributes, executing the second request.

9. The method of claim 8, further comprising:
responsive to generating the second set of rules, applying a third set of rules specifying whether to apply the second set of rules responsive to subsequent requests, wherein the third set of rules specifies whether to apply the second set of rules to: (a) only a first user initiating the first request, or (b) both the first user initiating the first request and a set of additional users.

10. The method of claim 9, wherein the third set of rules includes criteria for specifying whether to apply the second set of rules, the criteria including one or more of:
a position of the first user in an organization including the set of additional users;
an authorization level of the first user;
a number of users initiating requests to modify the first set of rules in the same way;
a geographical region of the set of additional users; and
an organizational relationship of the set of additional users to the first user.

11. The method of claim 8, wherein applying the first set of rules to the first request comprises:
identifying, using a semantic-recognition model, semantic content of the first request;
identifying contextual metadata associated with the first request;
generating a first data set based on the semantic content and the contextual metadata, wherein generating the first data set includes extracting from the contextual metadata at least one attribute value for at least one data attribute among the first set of required attributes; and
applying the first set of rules to the first data set.

12. The method of claim 11, further comprising:
based on the semantic content of the first request, identifying the first request type of the first request;
analyzing a third set of rules associated with the first request type to identify a set of metadata sources from which to obtain the contextual metadata; and
obtaining the contextual metadata from the set of metadata sources.

13. The method of claim 8, further comprising:
identifying a data object type associated with the first request;
responsive to determining that the data object type does not include the particular data attribute: adding the particular data attribute to the data object; and
responsive to receiving the second request of the first request type: generating an instance of the data object type including a field associated with the particular data attribute.

14. A non-transitory computer-readable medium comprising instructions which, when executed by one or more hardware processors, causes performance of operations comprising:
receiving, via a conversational interface, a first request of a first request type;
applying, to the first request, a first set of rules specifying a first set of required attributes corresponding to the first request type;
responsive at least to determining that the first request omits at least one value of the first set of required attributes:
determining whether to modify the first set of rules to generate a second set of rules including a second set of required attributes for the first request type;
responsive to determining whether to modify the first set of rules to generate the second set of rules, modifying the first set of rules to generate the second set of rules that specify the second set of required attributes for the first request type, wherein the second set of required attributes omits at least one required attribute, corresponding to the at least one value of the first set of required attributes that was omitted from the first request;
receiving, via the conversational interface, a second request of the first request type;
applying the second set of rules to the second request to determine that the second request comprises values for each of the second set of required attributes corresponding to the first request type; and
responsive at least to determining that the second request comprises values for each of the second set of required attributes, executing the second request.

15. The computer-readable medium of claim 14, wherein the operations further comprise:
responsive to generating the second set of rules, applying a third set of rules specifying whether to apply the second set of rules responsive to subsequent requests, wherein the third set of rules specifies whether to apply the second set of rules to: (a) only a first user initiating the first request, or (b) both the first user initiating the first request and a set of additional users.

16. The computer-readable medium of claim 15, wherein the third set of rules includes criteria for specifying whether to apply the second set of rules, the criteria including one or more of:
a position of the first user in an organization including the set of additional users;
an authorization level of the first user;
a number of users initiating requests to modify the first set of rules in the same way;
a geographical region of the set of additional users; and
an organizational relationship of the set of additional users to the first user.

17. The computer-readable medium of claim 14, wherein applying the first set of rules to the first request comprises:
identifying, using a semantic-recognition model, semantic content of the first request;
identifying contextual metadata associated with the first request;
generating a first data set based on the semantic content and the contextual metadata, wherein generating the first data set includes extracting from the contextual metadata at least one attribute value for at least one data attribute among the first set of required attributes; and
applying the first set of rules to the first data set.

18. The computer-readable medium of claim 17, wherein the operations further comprise:
based on the semantic content of the first request, identifying the first request type of the first request;
analyzing a third set of rules associated with the first request type to identify a set of metadata sources from which to obtain the contextual metadata; and
obtaining the contextual metadata from the set of metadata sources.

19. The computer-readable medium of claim 14, wherein the operations further comprise:
identifying a data object type associated with the first request;

responsive to determining that the data object type includes a field for a particular data attribute associated with the at least one required attribute of the first set of required attributes:
removing the at least one required attribute from the data object; and and
responsive to receiving the second request of the first request type: generating an instance of the data object type omitting any field associated with the particular data attribute.

20. A system, comprising:

one or more processors; and memory storing instructions that, when executed by the one or more processors, cause the system to perform operations comprising:

receiving, via a conversational interface, a first request of a first request type;

applying a first set of rules to the first request to determine that the first request comprises values for each of a first set of required attributes corresponding to the first request type, wherein the first request further comprises a value for a particular data attribute that is not included in the first set of required attributes corresponding to the first request type;

responsive at least to determining that the first request comprises values for each of the first set of required attributes, executing the first request;

responsive at least to determining that the first request comprises the value for the particular data attribute: modifying the first set of rules to generate;

a second set of rules that specify a second set of required attributes for the first request type, the second set of required attributes including the particular data attribute that was not included in the first set of required attributes;

receiving, via the conversational interface, a second request of the first request type;

applying the second set of rules to the second request to determine that the second request comprises values for each of the second set of required attributes corresponding to the first request type; and responsive at least to determining that the second request comprises values for each of the second set of required attributes, executing the second request.

21. The system of claim 20, wherein the operations further comprise:

responsive to generating the second set of rules, applying a third set of rules specifying whether to apply the second set of rules responsive to subsequent requests, wherein the third set of rules specifies whether to apply the second set of rules to: (a) only a first user initiating the first request, or (b) both the first user initiating the first request and a set of additional users.

* * * * *

UNITED STATES PATENT AND TRADEMARK OFFICE
CERTIFICATE OF CORRECTION

| | | |
|---|---|---|
| PATENT NO. | : 11,823,667 B2 | Page 1 of 1 |
| APPLICATION NO. | : 17/670891 | |
| DATED | : November 21, 2023 | |
| INVENTOR(S) | : Penneru et al. | |

It is certified that error appears in the above-identified patent and that said Letters Patent is hereby corrected as shown below:

In the Claims

In Column 27, Line 6, in Claim 19, delete "and and" and insert -- and --, therefor.

In Column 28, Line 3, in Claim 20, delete "generate;" and insert -- generate --, therefor.

Signed and Sealed this
Eighteenth Day of June, 2024

Katherine Kelly Vidal
*Director of the United States Patent and Trademark Office*